Feb. 7, 1956  C. JOHNSON  2,733,691
FEED CONTROL MECHANISM
Filed May 12, 1950  5 Sheets-Sheet 1

INVENTOR
CLARENCE JOHNSON
BY
ATTORNEY

Feb. 7, 1956   C. JOHNSON   2,733,691
FEED CONTROL MECHANISM
Filed May 12, 1950   5 Sheets-Sheet 2

Fig. 4

INVENTOR
CLARENCE JOHNSON
BY
Strauch, Nolan & Diggins
ATTORNEYS

Feb. 7, 1956

C. JOHNSON 2,733,691

FEED CONTROL MECHANISM

Filed May 12, 1950

INVENTOR
CLARENCE JOHNSON
BY
Strauch, Nolan & Diggins
ATTORNEYS

Fig. 6

United States Patent Office 2,733,691
Patented Feb. 7, 1956

2,733,691

FEED CONTROL MECHANISM

Clarence Johnson, South Euclid, Ohio, assignor, by mesne assignments, to The Hartford Special Machinery Company, Hartford, Conn., a corporation of Connecticut Application May 12, 1950, Serial No. 161,711

17 Claims. (Cl. 121—45)

The present invention relates to hydro-pneumatic power mechanisms for automatic relative positioning and feeding of a machine tool and a workpiece, and more particularly to a hydro-pneumatic mechanism adapted to facilitate drilling and like operations.

This application is a continuation-in-part of my co-pending application Serial Number 103,209, filed July 6, 1949, and entitled Drill Mechanisms, now abandoned.

The present invention is particularly adapted for drilling a hole with a conventional rotary drill where it is often desirable that the drill feed stroke be interrupted one or more times so the drill can be withdrawn from the hole to permit the clearing of chips from the holes and drill flutes and to permit the application of coolant or lubricant to the drill point. This periodic withdrawal and clearing of the drill effectively prevents deviation of the drill in the work and minimizes the heat and pressure developed in the drill and drill breakage thereby materially extending the life of the drill. While the invention is specifically disclosed in connection with such a use, it is to be understood that this invention may be applied to any other use where it may be desired to periodically disrupt and reverse the relative movement of a tool and workpiece to clear chips or permit proper application of a coolant to the tool and workpiece.

In such usage, it is desirable that the withdrawal of the tool from the work and its approach to the work be effected at a comparatively rapid rate to minimize the time during which the tool is idle. To prevent damage to the tool and its operating mechanism the rapid approach should be terminated just before the tool engages the work. The tool should then advance relative to the work at a suitable predetermined feed rate which may be continued until the completion of the work or until the tool is again withdrawn for clearing.

Accordingly, it is the primary object and purpose of the present invention to provide an improved fluid power mechanism which advances a tool at a predetermined slow feed rate after the tool engages the work and moves the tool at a greater speed while it is being withdrawn from the work and returned again to its operating position.

It is a further more specific object to provide an improved power mechanism operable to withdraw a drill or other tool at a high speed from any position in the work and to return the tool at high speed to a point just short of its last working position.

It is a further object to provide an improved power mechanism of the character described in which movement of the tool is controlled by accurately and variable positioned positive mechanical stops.

It is a further object to provide a hydro-pneumatic device utilizing a compressible fluid to effect rapid movement of a power operated element and an incompressible fluid to control the movements of the element both as to direction and rate of movement.

It is a further object to provide an improved hydro-pneumatic device having a minimum number of working parts which is compact, inexpensive and reliable in operation.

In some instances it is desirable that the tool be initially positioned at some distance from the work to allow free access to the work. In such a case, it is desirable that the tool initially approach the work at a relatively rapid rate, then be fed relative to the work at a slow feed rate, then be retracted from the work for clearing the tool and application of coolant and returned to its last working position at a fast rate, and finally to be again fed relative to the work at a slow feed rate. In such usage, it is usually desirable that the tool be returned to its initial position only after completion of the operation and that intermediate clearing withdrawals be of sufficient length merely to assure that the tool clears the work. On the other hand it may be desirable to return the tool to its initial position in each clearing operation. In each case, the movement of the tool to and from the work should be effected at a rapid rate.

Accordingly, it is an object of the present invention to provide a tool operating mechanism operable to advance the tool rapidly initially to a point short of the work, and to effect a succession of clearing withdrawal operations, either returning the tool at high speed to its initial position or to the point just short of the work, and finally returning the tool to its initial position upon the completion of the operation.

In drilling holes which are several times the diameter of the drill in depth the drill may produce long chips which clog the flutes of the drill and jam the drill, generate an objectionable frictional heat, or otherwise reduce the effectiveness of the drill.

Accordingly, it is also an object of this invention to provide means for automatically preventing the formation of long chips in a drilling operation.

To this end, the present invention contemplates means for repeatedly interrupting the tool feed during the working portions of its stroke to provide very short incremental feed movements in relatively rapid cycles.

Other objects and advantages will become apparent as the description proceeds in connection with the accompanying drawings in which:

Fig. 7A illustrates a modification of the mechanism of Fig. 7.

Figure 1:
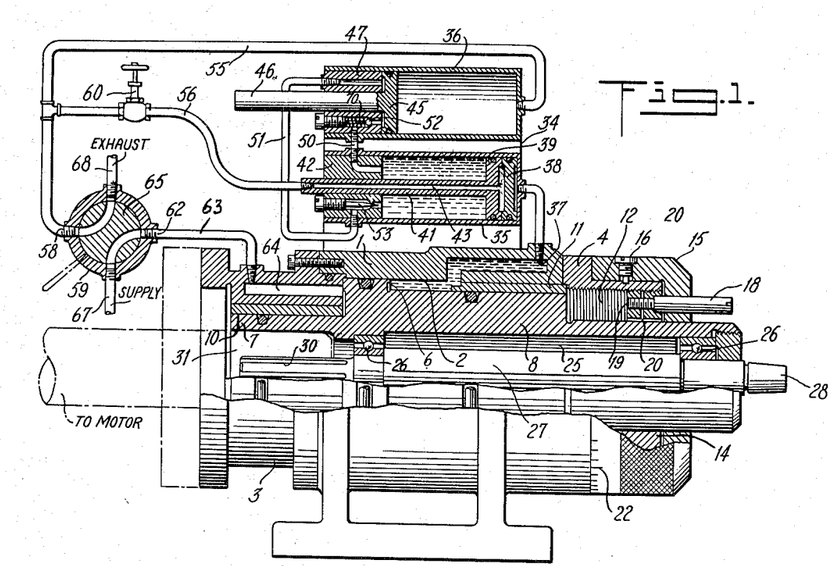
Fig. 1 is a view partly in section and partly in elevation of one form of my improved drill mechanism.
Figure 2:
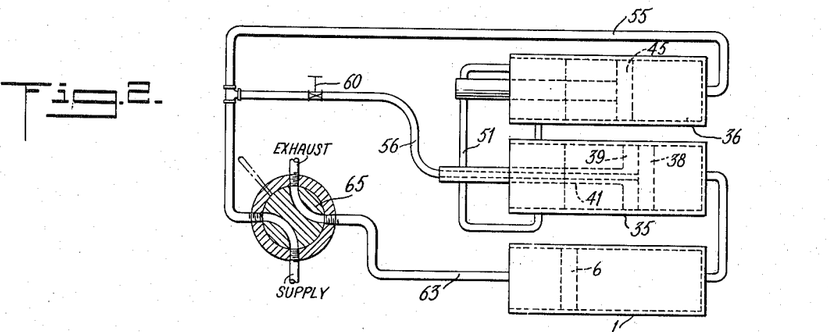
Figs. 2 and 3 are schematic diagrams of the drill mechanisms of Fig. 1 with parts in different positions.
Figure 3:
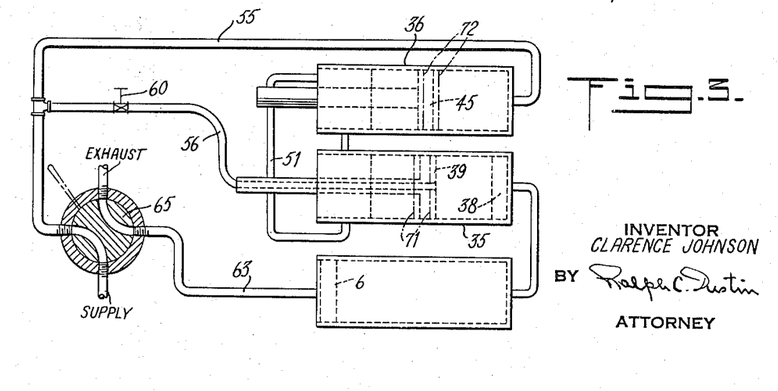

Referring now, more particularly to the mechanism of Figs. 1–3 the invention is there shown in conjunction with a drill mechanism including a power cylinder 1 having a bore 2 which is closed at its ends by cylinder heads 3 and 4. Received within the cylinder is a piston having a portion 6 slidably engaging the walls of the bore 2. At opposite sides of the portion 6 are reduced piston portions 7 and 8, the portion 7 being slidably received within a sleeve-like member 10 in the head 3, and the portion 8 moving through a sleeve-like member 11 in the bore 2 into a space 12 in the head 4 on forward movement of the piston. An annular stop member 14 is received in the space 12 for engagement by the piston portion 8 to limit its forward movement. Member 14 threadably engages the cylinder head 4 so that it may be axially adjusted along head 4 for varying the travel of the piston. Rotatably mounted on the forward portion of the cylinder head 4 is a cap 15 which is held in place by members 16 threaded into openings in the cap and having reduced portions received in an annular groove in head 4. A pin 18 is threaded into an opening 19 in the stop member 14 and extends forwardly freely through an opening in the cap so that rotation of the cap will be transmitted to member 14. The portion of stop member 14 adjacent the pin is annularly split, as at 20, and the pin is provided with a shoulder engageable with the forward face of the member 14 so that the split portions may be moved relative to each other when the pin is threaded into the opening 19, and effect a locking of the member 14 in place in adjusted position. To change the position of the member 14, it is merely necessary to loosen pin 18 and then rotate cap 15. The pin may then be tightened for locking the member 14 in its new position.

In order that the operator may know the maximum stroke that may be obtained by any adjustment of the member 14, there are provided markings 22 on the cap adapted to cooperate with a suitable marking, not shown, on the stationary head 4. Suitable markings, not shown, may also be provided on the pin 18 for indicating the position of member 14 relative to the front cylinder head.

An alternate means for adjusting the travel of the piston is disclosed in my copending application Serial No. 133,922, filed December 19, 1949, and is of particular utility where it is desired to mount a gang drill head on the protruding end of piston portion 8.

Extending axially through the piston is an opening 25, and rotatably supported by bearings 26 located at opposite ends of this opening is a shaft 27 which carries at one end a chuck 28 adapted to receive a drilling implement, not shown. The opposite end of shaft 27 is splined as at 30 to receive a shaft 31 extending into the cylinder head 3 and freely within the corresponding end of opening 25 and adapted to be driven by a motor, not shown. The bearings 26 are fixed to the piston and engage shoulders on the shaft 27 so that shaft 27 is caused to reciprocate with the piston. The splined driving connection is made of such dimensions axially as to permit reciprocation of the shaft through any of the possible range adjustments.

Fixed to the side of the cylinder 1 is a plate 34 carrying control cylinders 35 and 36 which have bores of substantially equal diameters. The space in the bore 2 between the piston portion 6 and the sleeve-like member 11 is connected by passage means 37 to the right hand end of cylinder 35, and this space and passage means is filled with a liquid, such as oil. Reciprocably contained within the cylinder 35 is a withdrawal piston 38 and an abutment piston 39 which are adapted for relative movement with respect to each other within the cylinder. The piston 39 is provided with a piston rod 41 extending through a cylinder head 42 at the left hand end of the cylinder, and extending axially through the piston rod is a passage 43 communicating with the space between the pistons 38 and 39.

Received within the cylinder 36 is a differential piston 45 carrying a piston rod 46 which extends through a cylinder head 47 at the left hand end of the cylinder. This piston rod is slightly larger in diameter than the piston rod 41 for reasons that will be explained later. The spaces in the cylinders 35 and 36 at the left hand side of the pistons 39 and 45 are placed in communication with each other through separate passage means 50 and 51 opening through the cylinder heads 42 and 47. These spaces and passage means are filled with a liquid, such as oil. Arranged in the passage means 50 is a ball check valve 52 which permits liquid to flow only from the cylinder 36 to cylinder 35. An adjustable metering valve 53 in the passage means 51 permits a restricted flow of liquid between cylinders 35 and 36 in either direction.

The right end of cylinder 36 and passage 43 in piston rod 42 are connected by conduits 55 and 56 to a port 58 in a supply valve casing 59. A portion of the conduit 56 is flexible so that piston 39 may reciprocate freely in the cylinder 35. Also connected in conduit 56 is a manually adjustable three way valve 60 for regulating the flow of fluid to selectively vent the passage 43 to atmosphere. A port 62 in valve casing 59 diametrically opposite the port 58 is connected by a conduit 63 and a passage 64 in cylinder head 3 to the cylinder bore 2 at the left hand side of piston portion 6. Arranged in the valve casing 59 is a manually adjustable valve member 65 which is adapted to connect the ports 58 and 62 selectively in communication with pressure fluid supply and exhaust connections 67 and 68, respectively.

The operation of the mechanism described is as follows. At the time when the drilling of a hole is started, the parts are in the positions shown in Fig. 1 with conduits 55 and 56 connected to exhaust through the valve 65 and conduit 63 connected to a supply of suitable pressure fluid, which is preferably air but may, if desired, be a suitable source of pressure liquid such as oil. At this time, pressure fluid is supplied through conduit 63 and passage 64 to the left end of cylinder bore 2 for moving the drill piston to the right. The shaft 27 being driven by the power shaft 31 is moved forwardly with the piston to feed the drilling implement toward the work. As the drill piston moves to the right, liquid is forced from the space ahead of piston portion 6 through passage means 37 to the right hand end of cylinder 35. The pistons 38 and 39 are moved to the left at a slow rate of speed since the liquid in cylinder 35 can flow to cylinder 36 only through metering passage means 51 and this flow is restricted by valve 53. The drill piston is, therefore, permitted to move only at a slow rate while the drilling implement approaches the work and is cutting material.

When the hole is partially drilled and it is desired to withdraw the drill from the hole to clear the chips, supply coolant or for any other reason, the parts being in relative positions such as indicated in Figure 2, the valve 65 is positioned to connect the cylinder 1 to exhaust through the conduit 63 and to supply pressure fluid to the conduits 55 and 56. The valve 60 is arranged at this time, as it is during all of the drilling operations except when the hole has been completed, to prevent the venting of passage 43 to atmosphere and to allow unrestricted flow in either direction through conduit 56. The pressure fluid from the conduit 55 acts to force piston 45 to the left, and the pressure fluid is delivered through conduit 56 into the space between pistons 38 and 39 to force them in opposite directions. The load of the drill piston and the drilling implement being comparatively small and the resistance to movement of piston 39 being relatively great, piston 38 is moved rapidly to the right and forces liquid into the bore 2 at such a rate that the drill is withdrawn rapidly from the hole. The pressures acting to move the pistons 39 and 45 to the left are substantially the same, but, since the diameter of piston rod 46 is only slightly greater than that of the piston rod 41, a pressure differential will exist at the left of pistons 39 and 45 but will be insufficient to overcome spring 70 and unseat ball check valve 52 and produces an opposing force on the left hand side of piston 45 slightly less than that exerted on the left hand side of piston 39. As a consequence, piston 45 is moved a slight distance to the left from the position shown in Figure 2 while the drill piston is being moved to the left hand end of the bore 2. The liquid displaced by the piston 45 passes through the passage means 51 and past the restricting valve 52 to the cylinder 35 moving piston 39 a slight distance to the right. The dash lines 71 and 72 in Figure 3 indicate the positions of the pistons 39 and 45 before this latter movement; these positions being the same as those shown in Figure 2. It will be noted that the pistons 39 and 45 are shown in Figure 3 in the positions which they assume when the drill piston has reached the left hand end of bore 2.

After the drilling implement has been cleared or the hole cleaned, the valve 65 is moved to the position of Fig. 1 for supplying pressure fluid to the bore 2 and exhausting pressure from the cylinders 35 and 36. The drill piston is then moved rapidly to return the drill toward its work until the piston 38 engages the piston 39. This engagement takes place just before the drill reaches the bottom of the hole previously drilled, and the movement of the drill from then on is at slow or feed speed because the piston 39 must force liquid from cylinder 35 past restricting valve 53 to cylinder 36 as forward movement of the drill takes place.

When the drilling of the hole has been completed, the valve 65 is positioned to supply pressure fluid to the conduit 55 and connect passage 64 to exhaust, and valve 60 is shifted to vent passage 43 to the atmosphere and interrupt communication between the supply conduit 67 and the conduit 56. The pressure on the left side of piston 45 is thus unopposed by pressure on the right side of piston 39. The pressure differential between cylinders 36 and 35 is then sufficient to unseat ball check valve 52 so that communication between cylinders 36 and 35 is established through passage 50 as well as passage 51. Thus piston 39 is rapidly returned to its initial position with piston 38 and the drilling implement. All components of the mechanism thus assume the position shown in Fig. 1 and the feed mechanism is readied for the initiation of a new cycle.

Figure 4:
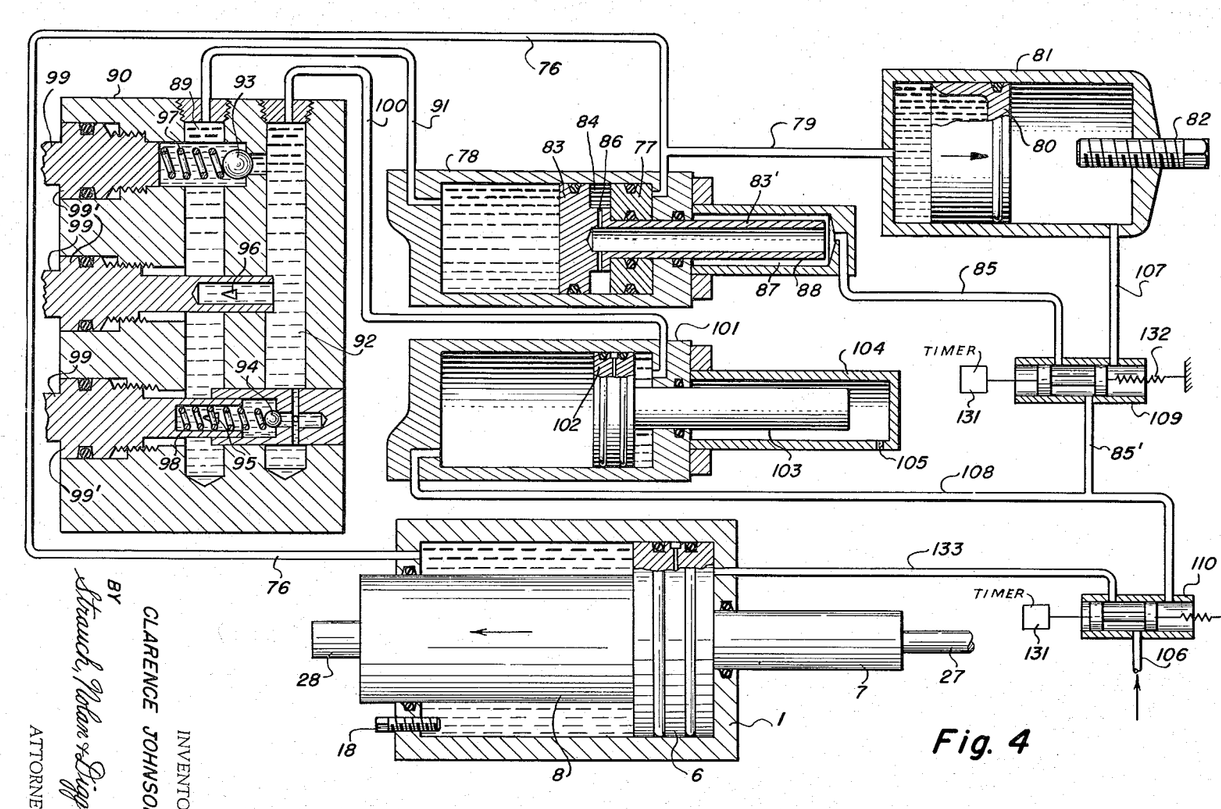
Fig. 4 is a schematic view partly in section illustrating a preferred embodiment of my improved drill mechanism.
Figure 5:
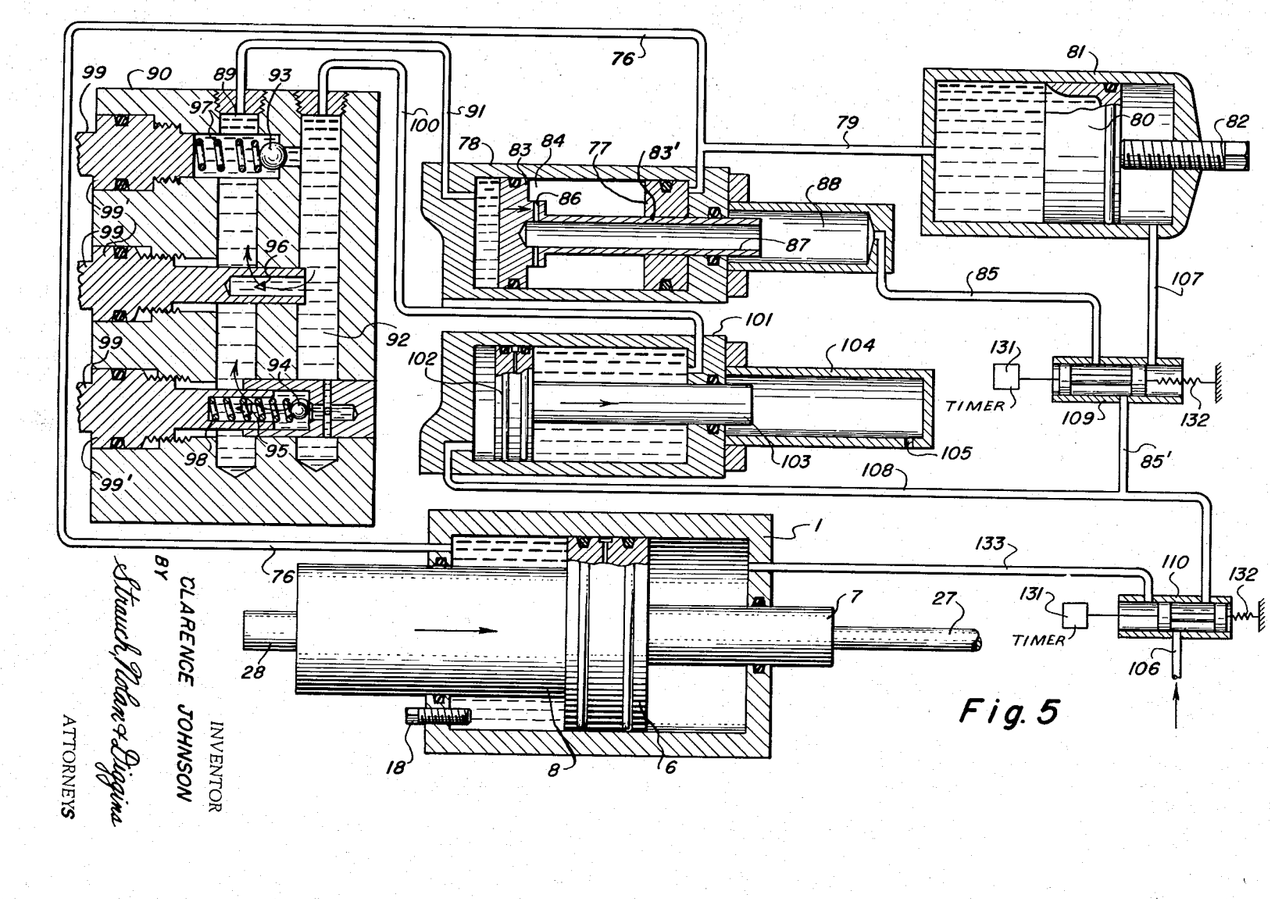
Figs. 5 and 6 are views similar to Fig. 4 illustrating the position of the elements of the mechanism of Fig. 4 at different points in the drilling cycle.
Figure 6:
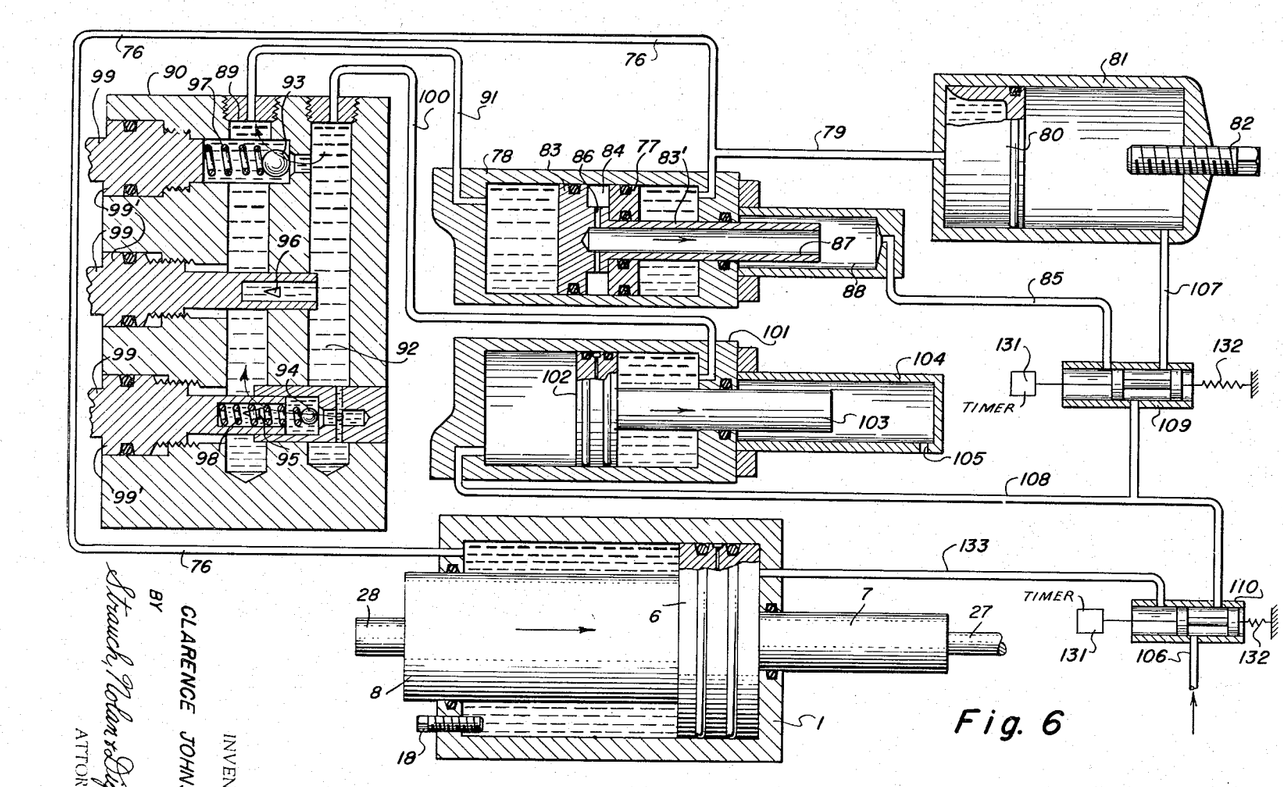

Figs. 4–6 of the drawing illustrate the presently preferred embodiment of the present invention. In this form of the invention, the power cylinder 1, and the power piston 6 having reduced portions 7 and 8 the latter portion forming a quill and adjustable stop 18 are shown diagrammatically and may take the form shown in Figures 1 to 3 of this application or that of the copending application of Clarence Johnson, Serial No. 133,922, filed December 19, 1949, now Patent No. 2,715,389 issued Aug. 16, 1955, and entitled Hydro-Pneumatic Power Mechanism. A drive shaft 27, carrying a chuck 28 is rotatably mounted in the piston portions 7 and 8 as heretofore described.

The forward end of cylinder 1 is in free communication through conduit 76 with the one side of a withdrawal piston 77 which is reciprocably received within a control cylinder 78 and through conduits 76 and 79 with one side of a rapid approach piston 80 reciprocably received within a rapid approach cylinder 81. An adjustable stop 82 is provided in cylinder 81 to limit the travel of piston 80.

A piston rod 83', which passes freely through a central aperture in piston 77 and through one end of cylinder 78 is rigidly attached to a movable abutment piston 83 which is reciprocably received with control cylinder 78.

The space 84 between pistons 77 and 83 is in communication with conduit 85 through passages 86, central bore 87 in piston rod 83' and chamber 88.

The left end of cylinder 78 is in communication with passage 89 in valve block 90 through conduit 91.

A second passage 92 in valve block 90 is connected to passage 89 through suitable valve passages containing, respectively, a ball check valve 93, a ball check valve assembly 94, having an adjustable bleed orifice 95 therein, and a separate adjustable bleed orifice 96. Spring 97 of valve 93 is considerably heavier than spring 98 of valve assembly 94 so that valves 93 and 94 will be unseated at different pressure differentials existing between chambers 92 and 89.

Plugs 99, threaded into suitably threaded ends of the valve passages in valve block 90 are provided to adjust the compression of springs 97 and 98 and vary the effective size of orifices 95 and 96. To seal the plugs against leakage, the bodies of the plugs are preferably enlarged as at 99' and provided with O rings sealingly engaging the bores of counterbores formed at the outer ends of the respective valve passages.

A conduit 100 connects passage 92 with one end of a control cylinder 101 in which a differential pressure piston 102 is reciprocably received. A piston rod 103, rigidly attached to piston 102, passes through one end of cylinder 101 into chamber 104 which is vented to atmosphere through passage 105.

The right side of piston 80, chamber 84, the left side of piston 102 and the right side of piston 6 are adapted to be connected to either the atmosphere or a source of air under pressure 106 through respective conduits 107, 85, 108 and 133 depending on the position of four way control valves 109 and 110 as hereinafter explained.

The spaces on the left side of pistons 6, 83 and 80, the spaces on the right side of pistons 77 and 102, the passages 92 and 89 and the connecting conduits are filled with any suitable hydraulic fluid of low viscosity at all times as indicated by the broken lines in Figs. 4–6.

It will be seen from Fig. 4, in which the drill piston 6 is shown fully withdrawn, that fluid reservoirs are provided on the right side of piston 102 and the left side of piston 80 so that considerable fluid loss may occur without affecting the operation of the system.

The operation of the drill feed mechanism may be explained for purposes of clarity with reference to the cycles which are illustrated in Figs. 4–6.

Fig. 4 shows the position of the moving elements and the control valves at the beginning of a drilling operation or cycle. At this time the valves 110 and 109 are in the position shown to supply air under pressure through conduit 133 to the right side of piston 6 to move the cylinder to the left toward the work and causing fluid to pass from cylinder 1 through conduits 76 and 79 into cylinder 81, the conduits 85, 107, and 108 being at this time vented to the atmosphere, the conduit 85' interconnecting valve 109 and conduit 108 serving to properly connect conduit 85 to exhaust or pressure in the various cycles of the mechanism hereinafter described. Since cylinder 81 is vented through conduit 107, the piston 80 moves rapidly to the right until it abuts stop 82, permitting the drill piston 6 to advance rapidly toward the work.

When piston 80 is forced against its stop, further flow through conduit 79 cannot take place and oil is forced into cylinder 78 at the right of piston 77 moving pistons 77 and 83, which are initially abutting, as a unit to the left. This movement, since pistons 77 and 83 are effectively contained in a closed oil circuit, forces oil out of cylinder 78, through conduit 91 into passage 89, through metering valve 96 into passage 92, and through conduit 100 into cylinder 101, moving piston 102 to the left. Since check valves 93 and 94 are closed and the left side of piston 102 is vented to the atmosphere, the rate of advancement of pistons 77, 83, and consequently the drill piston 6, is controlled solely by orifice 96. This provides accurate initiation and variable control of the rate at which the drill advances into the work after it is brought to a point just short of the work by the action of piston 80. Drilling at this controlled rate, assuming proper proportioning of the parts, will continue until piston 6 abuts stop 18 unless valve 110 or both valves 109 and 110 are moved to alter the application of pressure to and venting of conduits 107, 85, 108 and 133.

After the drill has advanced into the work a suitable distance and it is desired to withdraw the drill to clear the hole, valve 110 is shifted to the position shown in Fig. 5 to effect a rapid withdrawal of the drill from the work, the position of the movable elements at the end of the rapid withdrawal which is effected also being shown by Fig. 5. The shifting of control valve 110 to the position shown in Fig. 5 connects the right side of piston 6 to exhaust and supplies air under pressure to the left side of piston 102 and to chamber 84 through obvious paths.

Piston 6 then moves to the right under the influence of the air in chamber 84 acting on piston 77 which in turn forces oil from the right end of cylinder 78 into the left end of cylinder 1. Since the right side of piston 6 is vented to atmosphere, it will move rapidly to the right until piston 77 abuts against the right end of cylinder 78 after which no further movement of piston 77 or piston 6 to the right will occur.

It should be noted that with proper proportioning of the parts, piston 6 has thus been withdrawn only to a point necessary for the drill to clear the hole and not to its initial position shown in Fig. 4, since piston 80 has remained in its fully bottomed position.

Figure 7:
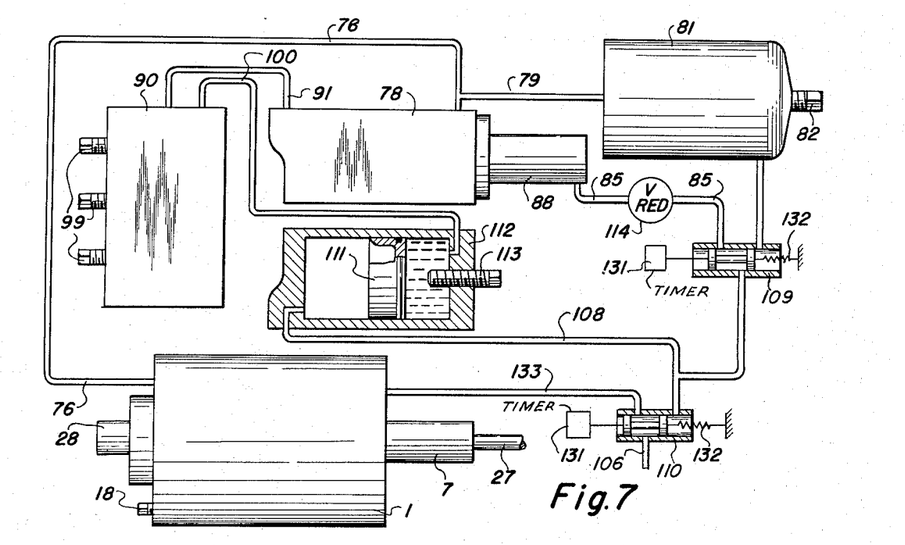
Fig. 7 is a partial view of the mechanism of Figs. 4–6 showing a modification of one of the control elements.
Figures 7, 8, 9:
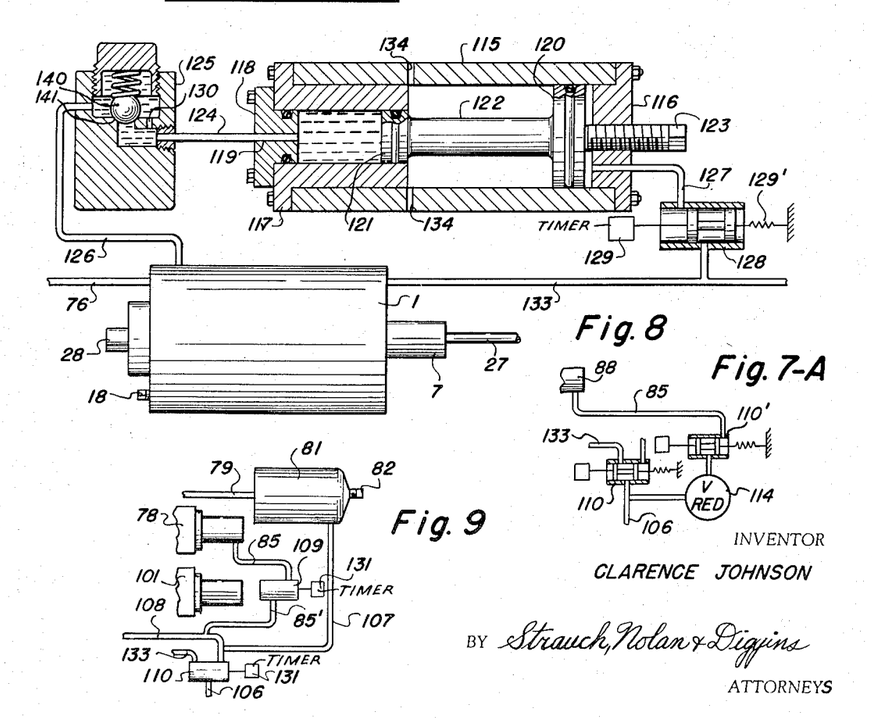
Fig. 8 is a partial view of the mechanism of Figs. 4–6 illustrating a means for disrupting the normal drill feed.
Fig. 9 is a partial view of the mechanism of Figs. 4–6 illustrating a means for effecting a modified drilling cycle.

Should it be desirable that the drill be returned to its initial position in each clearing cycle, the cylinder 81 should be connected through conduit 107 directly to conduit 108 as shown in Fig. 9. In this case, air under pressure would also be supplied to the right side of piston 80 in each withdrawal stroke, forcing oil from cylinder 81 into cylinder 1 so that the piston 6 is carried through its full stroke to the right. In this case the piston 77 would bottom and piston 80 would return to its initial position and hold the piston 6 in positive engagement with the right end of cylinder 1.

Referring again to Fig. 5 and the operation effected by shifting valve 110 only, the air in chamber 84 tends to move piston 83 to the left establishing a pressure in passage 89 equal to the air pressure. At the same time the air pressure acting on piston 102 tends to move it to the right establishing an opposing pressure in passage 92. Because of the difference in effective area of the two sides of piston 102, caused by the area of rod 103, the pressure in passage 92 will be appreciably above the pressure in chamber 89. The check valves 93 and 94 are so designed that this pressure differential will unseat the valve 94 allowing fluid to pass through orifice 95 as well as orifice 96 but will not unseat valve 93. Oil thus flows from passage 92 to passage 89 through metering orifices 95 and 96 and then to piston 83 causing piston 83 to move at a predetermined rate, which may be varied by adjustment of the orifice of valve assembly 94 to assure movement of piston 83 to the right a small amount dependent upon the increment of time valve 110 is maintained in the position shown in Figure 5. It is to be understood that the adjustment of the orifice of valve assembly 94 does not affect the rate of feed movement obtained through orifice 96 and is preferably such that abutment piston 83 will be positioned at a point just slightly to the right of the position reached at the end of the previous feed stroke during the increment of time required to withdraw the drill from the work.

After the hole has been cleared and it is desired to resume the drilling operation, valve 110 is shifted to the position of Fig. 4 with the movable elements positioned as shown in Fig. 5. Air under pressure is then supplied to the right side of piston 6 and oil is forced into the cylinder 78 against the right side of piston 77 as previously described. Since space 84 is vented, piston 77 will move rapidly to the left allowing a corresponding rapid advance of piston 6 until piston 77 abuts piston 83 when pistons 6, 77, 83 will move to the left again at the slow feed rate determined by the size of orifice 96 as explained in connection with Fig. 4.

It is to be noted that, since piston 83 moved slightly to the right during the withdrawal of the drill, the rapid advance of the drill is terminated at a point just short of the bottom of the drilled hole.

When the hole to be drilled has reached its final depth, both the movable abutment piston and the drill piston are rapidly returned to their initial positions to restore all of the movable elements to their positions shown in Figure 4.

Figure 6 illustrates the relative position of the movable elements of the system at the moment the final portion of the final rapid withdrawal is initiated. In this position both control valves 109 and 110 have been shifted as shown in Figure 6. In this operation, which is the only time valve 109 is moved, air under pressure is supplied to the right side of piston 80 and to the left side of piston 102 while the space 84 and the right side of drill piston 6 are connected to exhaust. Piston 80 is moved to the left forcing the oil in cylinder 81 to the left side of drill piston 6 to move piston 6 to the right and at the same time maintaining pressure against the right side of piston 77 to hold it against piston 83 and apply pressure to passage 89. Although the piston 102 at this time is being urged to the right forcing oil into passage 92, the pressure differential between the passages 92 and 89 is not sufficient to unseat valve 93. Therefore, until piston 80 abuts against the left end of cylinder 81 to relieve the pressure applied to the right of piston 77, pistons 77, 83, and 102 move to the right slowly under the influence of the oil flowing through metering orifices 95 and 96 only. After piston 80 has completed its stroke, it no longer exerts a pressure against piston 77. At this time, a pressure differential is established between passages 92 and 89 sufficient to unseat valve 93 and pistons 77, 83, 102, and 6 move rapidly to the right until piston 6 comes to rest against the right end of cylinder 1 as shown in Figure 6. Because of the intensifier action of piston 102, this piston will continue to move to the right in tandem with pistons 77 and 83 and will force piston 80 to the right despite the pressure in conduit 107, until piston 77 abuts the right end of cylinder 78 at which time the movable components of the system have been restored to their initial position shown in Figure 4 and a new drilling cycle may be initiated.

Fig. 7 illustrates a modification of the construction of cylinder 101 and piston 102. In this figure, a free floating piston 111, having pressure faces of equal area, replaces piston 102 and is reciprocably received in a cylinder 112 provided at one end with an adjustable stop 113. Such a piston, which may be replaced by a bellows, bladder, diaphragm or the like, cannot produce the required pressure differential between passages 92 and 89. To establish the necessary pressure differential, a pop-off or similar pressure reducing valve 114 which does not restrict the flow of air through conduit 85 is inserted in conduit 85 to reduce the pressure in the chamber 84. As shown in Fig. 7A, the pressure reducing valve 114 may be connected directly to pressure line 106 in which case an independent solenoid operated valve 110' is then preferably interposed between the valve 114 and the conduit 85 to provide a separate exhaust path. This enables chamber 88 to be placed under pressure or exhausted at any time, should this be desired, without effecting operation of the other solenoid control valves. A detailed description of the operation of these modifications is not believed necessary here as the remaining elements and their functions are unchanged.

It is often desirable to interrupt the advancement of the power piston temporarily when performing work to effect a pulsating feed stroke. Such feed action has been found to be particularly desirable in drilling or turning materials such as cast iron or magnesium, which tend to crumble, to keep the chips in loose non-compacted condition or steel, which forms long chips, to break the chips into short lengths and in either case prevent clogging the tool or other impairment of its effectiveness or in conveyor feed of articles to a machine. Since the advancement of the power piston is determined by regulation of the exhaust of fluid from the low pressure side of the piston, this result may be readily achieved by establishing a pulsation in the exhaust system. For example, the device of Fig. 8 may be provided to impart periodically interrupted feed movement to a drill which it has been found will effectively prevent the formation of chips likely to clog the flutes of the drill.

The mechanism includes a cylinder 115 having an end plate 116 and an internally mounted sleeve-like member 117 at its opposite ends. The member 117 forms a cylinder for piston 121 and contains within its inner bore a reservoir of fluid for use as hereinafter described. An end plate 118, attached to member 117, has a central aperture 119 to permit the passage of fluid therethrough. Pistons 120 and 121, rigidly attached to the opposite ends of rod 122, are reciprocably received in the internal bores of cylinder 115 and member 117, respectively. The piston stroke is controlled by an adjustable stop 123 in head 116. The left end of cylinder 115, which is filled with hydraulic fluid, is in communication with the forward end of cylinder 1 through conduit 124, adjustable ball check valve 125 containing a valve head 140, a bleed passage 130 circumventing the ball check passage 141, and conduit 126. The opposite end of cylinder 115 is connected through conduit 127 alternately to pressure conduit 133 or exhaust, by valve 128. The space between the piston is vented to atmosphere at all times through passage 134.

When the drill is advancing in the work and conduits 126 and 133 are under pressure, a timer 129 which may be of any conventional design, is put in operation to supply air under pressure to the right side of piston 120 for short periods at a relatively high frequency. Because of the difference in effective area of the pistons 120 and 121, both pistons are moved to the left forcing oil into the forward end of cylinder 1 causing either a slight withdrawal of the drill, a momentary dwell or slowing up of the forward feed followed by further forward feeding at the normal feed rate. When the timing cycle is completed, timer 129 is de-energized and valve 128 is returned by spring 129' to the position shown in Fig. 8 connecting the right side of piston 120 to exhaust. Oil under pressure is then forced from the front end of cylinder 1 through bleed passage 130 into cylinder 115 against the left side of piston 121 as a result of the feed pressure on piston 6. The pistons 121 and 120 are, therefore, immediately returned to their initial positions and the drill is advanced at a rate slightly in excess of its normal feed rate, because of the oil bleeding through passage 130, to approximately the point reached prior to operation of the mechanism.

It will be appreciated that since oil is being bled out of cylinder 1 through conduit 76 during the period of interruption, the drill may be returned to a point slightly deeper than the point where the interruption was begun. This may or may not be detrimental depending upon the material being drilled, the drill speed, etc. If not, conduits 119 and 126 may be connected directly. However, if this condition is undesirable, the bleed 130 should be provided in the body of valve 125 to control the rate at which the drill is returned to the bottom of the hole.

For purposes of illustration, the cylinder 115 and ball check valve 125 have been shown on a considerably enlarged scale in Fig. 8. In practice, its actual size will depend on the desired character of the interruption of the normal feed. By variation in the size of the unit it will be possible intermittently to slow the feed, to stop it, or to produce reciprocatory impulses of relatively small amplitude.

The mechanism as a whole readily lends itself to semiautomatic or fully automatic control since the control valves 109 and 110 may be operated manually or by any conventional means such as solenoids 131 and springs 132 or by opposing solenoids.

By the proper employment of suitable switches and relays the system can be automatically operated in response to a number of control factors. For example, a conventional pressure switch may be installed in the forward end of cylinder 1 to withdraw the drill when the hydraulic pressure ahead of piston 6 falls below a predetermined minimum due to the bottoming of piston 6 against stop 18 or the buildup of excessive pressure at the drill point as disclosed in the aforesaid copending application Serial No. 133,922.

It will be apparent from the foregoing that the basic unit herein disclosed is capable of being operated through cycles of widely differing character, making it suitable for practically any operation desired.

All of the critical ranges of operation as well as the various speeds at which the power piston is carried through its cycle may be varied easily, accurately, and positively within wide limits.

Should it be desirable for any reason to effect a variation in the cycle beyond that which can be achieved by the adjustments provided, the control cylinders, pistons, and fluid passages may be re-proportioned in a number of ways which will be obvious to the skilled mechanic.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A power feed mechanism comprising, in combination, a power cylinder, a power piston reciprocably received within said cylinder, means for feeding said power piston comprising a feed cylinder, means connecting one end of said feed cylinder in free communication with the forward face of said power piston, a restricted passage means opening into the other end of said feed cylinder, two pistons received in said feed cylinder and adapted to reciprocate relative to each other, means connecting the space between said two pistons and the space at the rear end of said power piston selectively to pressure fluid supply and to exhaust, one of said spaces being connected to exhaust while the other space is connected to fluid supply, a liquid filling the space between the forward end of said power piston and one of said two pistons, a liquid filling the space between the other of said two pistons and the adjacent end of said feed cylinder, and means supplying liquid through said restricted passage means to said feed cylinder when the space between said two pistons is connected to pressure fluid supply.

2. A power feed mechanism comprising, in combination, a power cylinder, a power piston reciprocably received within said cylinder, means for feeding said power piston comprising a feed cylinder, means connecting one end of said feed cylinder in free communication with the forward face of said power piston, a restricted passage means opening into the other end of said feed cylinder, two pistons received in said feed cylinder and adapted to reciprocate relative to each other, a piston rod attached to one of said two pistons and extending through one end of said feed cylinder, a passage extending through said piston rod into the space between said two pistons, means connecting said passage and the rear end of said power piston selectively to pressure fluid supply and to exhaust, said passage being connected to exhaust while said power piston is connected to pressure fluid supply, a liquid filling the spaces communicating with the outer ends of said two pistons, and means supplying liquid through said restricted passage means to said feed cylinder when the space between said two pistons is connected to pressure fluid supply.

3. A power feed mechanism comprising, in combination, a power cylinder, a power piston reciprocably received within said cylinder, means for feeding said power piston comprising a first feed cylinder, means connecting one end of said feed cylinder in free communication with the forward face of said power piston, a second feed cylinder, a restricted passage means connecting the other end of said first feed cylinder with one end of said second feed cylinder, two pistons in said first feed cylinder adapted to reciprocate relative to each other, a piston reciprocably received in said second feed cylinder, means connecting the space at the other end of said second feed cylinder, the space between said two pistons in said first feed cylinder, and the space at the rear end of said power piston selectively to pressure fluid supply and to exhaust, the spaces in said feed cylinders being connected to exhaust or supply while the space at the rear of the power piston is connected to supply or exhaust, and a liquid filling the spaces and passage means communicating with the outer ends of said two pistons.

4. The mechanism of claim 3 in which one of said two pistons is provided with a piston rod extending through said other end of said first feed cylinder, and said last mentioned piston is provided with a piston rod extending through said one end of said second feed cylinder, the diameter of the piston rod for said last mentioned piston being slightly larger than that for the one of said two pistons.

5. The mechanism of claim 3 in which one of said two pistons and said last mentioned piston are provided with piston rods extending through the ends of their respective cylinders which are connected by said restricted passage means, the piston rod for said last mentioned piston being larger in diameter than the other of said piston rods, a second passage means connecting said other end of said first feed cylinder with said one end of said second feed cylinder, and a valve mechanism permitting fluid to flow through said second passage means only from said second feed cylinder to said first feed cylinder.

6. A power feed mechanism comprising, in combination, a power cylinder, a power piston reciprocably received within said cylinder, means for feeding said power piston comprising first and second feed cylinders, separate passage means connecting one end of said first feed cylinder to one end of said second feed cylinder, adjustable valve means restricting fluid flow through one of said passage means, valve means permitting fluid flow through the other of said passage means only from said second feed cylinder to said first feed cylinder, passage means connecting the other end of said first feed cylinder to the forward side of said power piston, two pistons in said first feed cylinder adapted to reciprocate relative to each other, a piston reciprocably received in said second feed cylinder, a liquid filling the spaces and passage means communicating with the outer ends of said two pistons, separate fluid conducting means communicating with the other end of said second feed cylinder, the space between said two pistons, and the rear end of said power piston, means connecting the fluid conducting means selectively to pressure fluid supply and to exhaust, and a manually adjustable valve for cutting off the flow of fluid through said conducting means leading to the space between said two pistons.

7. The mechanism of claim 6 in which the piston in said second feed cylinder has a piston rod extending through said one end of said second feed cylinder, one of said two pistons has a piston rod extending through said one end of said first feed cylinder, the diameter of said first mentioned piston rod being larger than that of said second mentioned piston rod, and said means conducting fluid to the space between said two pistons including a passage extending axially through said second mentioned piston rod.

8. A power feed mechanism for controlling the movements of a power piston comprising; means for applying a fluid pressure to one side of said power piston to advance said power piston; a control cylinder containing a control piston; a fluid circuit communicating with the opposite side of said power piston and one side of said control piston; control means for regulating the movement of said control piston and thereby controlling the flow of fluid in said fluid circuit to establish a normal rate of movement of said power piston; and additional control means connected to said fluid circuit between said power piston and said control piston to selectively disrupt the normal rate of movement of said power piston, said additional control means comprising a reservoir cylinder connected through a fluid line to said fluid circuit; a feed piston in said reservoir cylinder adapted to move from a normal position in said reservoir cylinder to force fluid from said reservoir cylinder through said fluid line and into said fluid circuit; and fluid supply means to supply motive fluid to said feed piston at a preselected time.

9. The combination defined in claim 8 together with a ball check valve disposed in said line between said fluid reservoir cylinder and said fluid circuit and having a main check valve passage for transmitting fluid only from said reservoir cylinder to said fluid circuit and a by-pass bleed passage connected around said check valve and adapted to transmit fluid in both directions whereby said fluid passing through said main check valve passage will be returned to said reservoir cylinder at a predetermined rate to return said feed piston to its normal position upon completion of the feed movement of said feed piston.

10. In a power feed mechanism comprising a power feed piston adapted to move from the starting point to a final rest point through a succession of power strokes: means to control said strokes to establish a first control speed during a predetermined portion of each of said power strokes and a different control speed during other portions of each of said power strokes comprising, a fluid cylinder; a fluid conduit connecting one end of said cylinder ahead of said power feed piston; a second fluid conduit connecting the other end of said cylinder to a valve block having a normally open bleed passage; a pair of pistons, one comprising a control piston and the other an abutment piston, relatively movably supported with respect to each other and said cylinder and held in normally abutting relation under influence of the fluid pressure action on the opposite ends of said cylinder to be moved together in one direction at a relatively slow speed determined by fluid flow through said bleed passage to establish said first control speed; and fluid supply means for alternately introducing pressure fluid between said pistons to separate said pistons and then venting the space between said pistons whereby relative movement of said pistons into abutting engagement on venting of said space is controlled by free movement of said control piston toward said abutment piston to establish a different control speed at a higher speed rate; and a second control means adapted to automatically vary the length of the power stroke effected at each of the control speeds.

11. The combination defined in claim 10 together with means operable during said other portions of each of said power strokes to momentarily disrupt feeding movement of said power piston.

12. The combination defined in claim 10 wherein said second control means comprises a second control cylinder connected at one end to said valve block in series with said valve block, said second fluid conduit, and said abutment piston; a control piston slidably movable in said second control cylinder in response to fluid flow through said bleed passage against one face thereof; and fluid supply means for alternately introducing pressure fluid into the other end of said second control cylinder against the other face of said control piston and then venting the other end of said second control cylinder in correspondence with the supply of fluid pressure and venting of said space between said pair of pistons thereby disrupting normal movement of said control piston and the flow through said bleed passage to automatically position said abutment piston at a point to vary the respective lengths of the differing portions of the succeeding power stroke.

13. A power feed mechanism comprising a power piston movable in a power cylinder through an advance and retract stroke, means for controlling the movement of said power piston comprising a control cylinder, control and abutment pistons reciprocably mounted in said control cylinder, said control piston being freely movable in said control cylinder until it abuts against said abutment piston and thereafter movable at a rate determined by said abutment piston, a closed liquid circuit connecting one side of said power piston and one side of said control piston whereby said power piston and said control piston move in tandem, means for connecting the opposite side of said power piston to pressure while venting the space between said control piston and said abutment piston, and means for controlling the rate of movement of said abutment piston whereby said power piston and said control piston move in tandem at a first rate until said control piston abuts against said abutment piston and said power piston, said control piston and said abutment piston thereafter moving together at a rate determined by said last mentioned control means.

14. The mechanism of claim 13 together with means effective at a predetermined point in the movement of said power piston for selectively connecting the space between said control piston and said abutment piston to a pressure source while venting the space at said opposite side of said power piston to retract said control and said power pistons and separate means for simultaneously retracting said abutment piston at a slower rate than said control piston.

15. The power feed mechanism according to claim 13 wherein said means for controlling the movement of said abutment piston comprises a liquid circuit connected to the side of the abutment piston opposite that which contacts the control piston and means for restricting the flow in said fluid circuit.

16. A power feed mechanism for controlling the movements of a power piston movable in a power cylinder comprising means for connecting one side of said piston to a source of fluid pressure to advance said piston; a control cylinder containing a control piston; a fluid circuit connecting the opposite side of said power piston and one side of said control piston; control means for regulating the movement of said control piston and thereby controlling the flow of fluid in said circuit to establish a normal rate of movement of said power piston; a second control cylinder having coaxial bores of different size; connected pistons adapted to reciprocate respectively within said bores; means connecting the smaller of said bores to said fluid circuit; and means adapted to selectively periodically connect the larger of said bores to said source of fluid pressure to thereby periodically vary the quantity of fluid in said fluid circuit to thereby disrupt said normal rate of movement of said power piston.

17. A power feed mechanism for controlling the movements of a power piston movable in a power cylinder comprising; means for connecting one side of said piston to a source of fluid pressure to advance said piston; a control cylinder containing a control piston; a fluid circuit connecting the opposite side of said power piston and one side of said control piston; control means for regulating the movement of said control piston and thereby controlling the flow of fluid in said fluid circuit to establish a normal rate of movement of said power piston; a second control cylinder containing a second control piston; a branch fluid line connecting one end of said second control cylinder to said fluid circuit between said power piston and said control piston; and means to reciprocate said second control piston in said second control cylinder to periodically vary the quantity of fluid in said fluid circuit and thereby disrupt said normal rate of movement of said power piston.

References Cited in the file of this patent

UNITED STATES PATENTS

| | | |
|---|---|---|
| 2,067,492 | Kingsbury | Jan. 12, 1937 |
| 2,079,640 | Vickers et al. | May 11, 1937 |
| 2,183,297 | McKee et al. | Dec. 12, 1939 |
| 2,324,727 | Shartle | July 20, 1943 |
| 2,350,117 | Kline | May 30, 1944 |
| 2,418,840 | Karweit | Apr. 15, 1947 |
| 2,573,368 | Seborg | Oct. 30, 1951 |